UNITED STATES PATENT OFFICE.

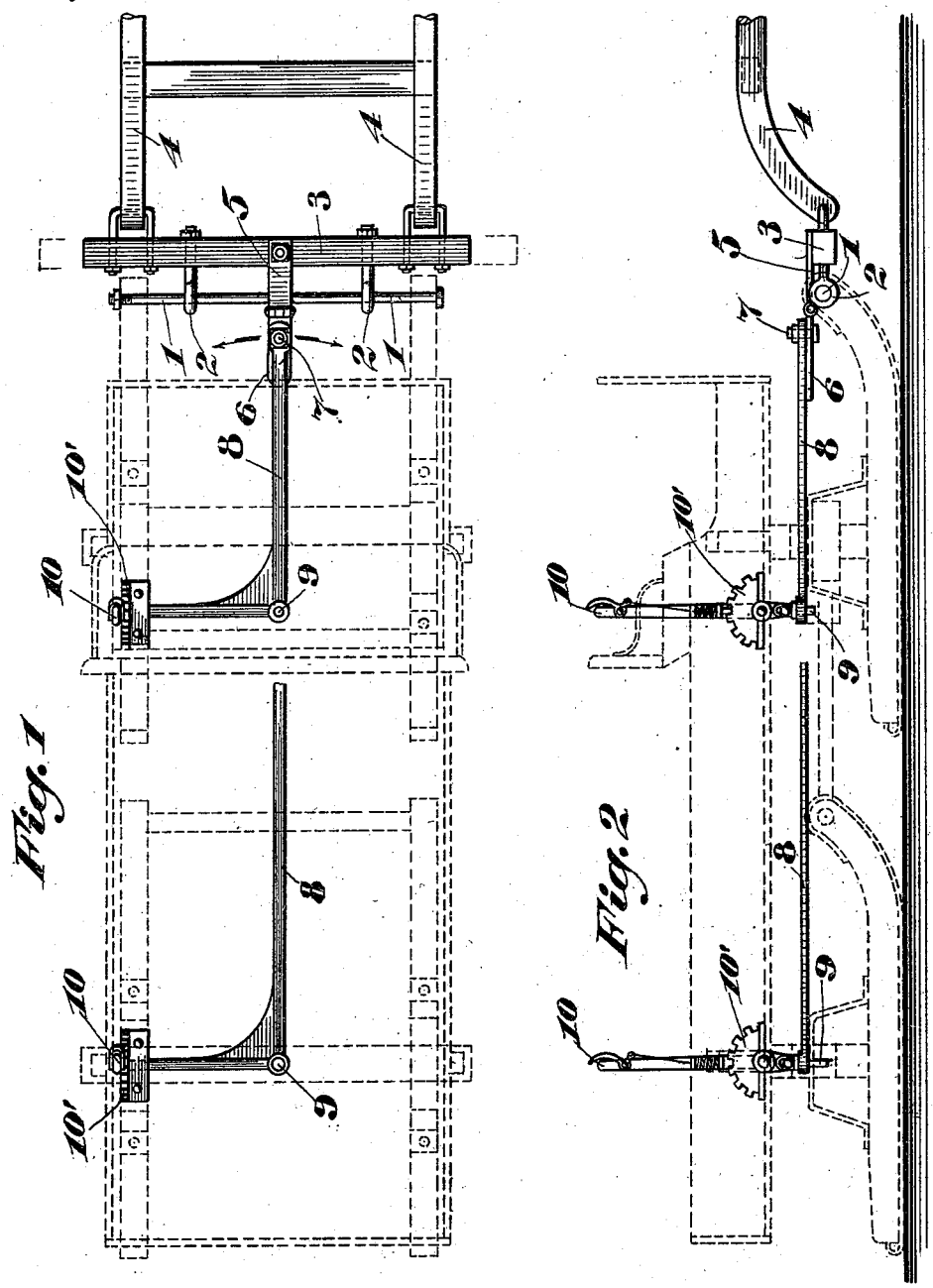

JOHN T. EMMERSON, OF EDMUNDSTON, NEW BRUNSWICK, CANADA, ASSIGNOR OF ONE-THIRD TO JOHN M. STEVENS AND ONE-THIRD TO AARON LAWSON, BOTH OF EDMUNDSTON, CANADA.

SHAFT-SHIFTER.

979,751.      Specification of Letters Patent.      Patented Dec. 27, 1910.

Application filed April 1, 1910. Serial No. 552,847.

*To all whom it may concern:*

Be it known that I, JOHN T. EMMERSON, a subject of the King of Great Britain, residing at Edmundston, county of Madawaska, in the Province of New Brunswick, Canada, have invented certain new and useful Improvements in Shaft-Shifters; and I do hereby declare that the following is a full, clear, and exact description of the invention, such as will enable others skilled in the art to which it appertains to make and use the same.

The invention to be hereinafter described relates to vehicles, and more particularly to vehicle shaft shifting devices.

Broadly speaking, it comprises a rod extending transversely across the front of the vehicle, sliding connections between the shaft connecting bar and the rod, means for moving the shafts laterally, and means for locking the moving means in adjusted position.

In order to more clearly disclose the construction, operation and use of the invention, reference should be had to the accompanying drawings forming part of the present application.

Throughout the several figures of the drawings, like reference characters designate the same parts.

In the drawings: Figure 1 is a plan view of one preferred form of the construction; and Fig. 2 is a side elevation of Fig. 1.

The main objects of the invention are to provide a shaft shifting device of simple, economical and durable construction which may be readily and easily applied to sleighs and other vehicles without substantial alterations.

Referring to the drawings in detail, 1 indicates a rod solidly secured in the forward ends of the sleigh runners or in the framework of the vehicle. On this rod are slidably mounted several eyes 2, which are bolted or otherwise secured to a beam or bar 3 connecting the rear ends of the shafts 4. To the center of the beam 3 is rigidly connected a plate 5, to which is vertically hinged a second plate 6. The plate 6 is slotted longitudinally to receive a bolt 7 extending from the outer end of the long arm of a bell crank lever 8 fulcrumed at 9. The slot and bolt connection between the lever 8 and plate 6 allows of the necessary movement between them when the lever is operated.

In order to operate the lever, a hand lever 10 is provided. This hand lever is pivotally mounted on the side of the vehicle and is connected to the free end of the short arm of the lever 8. It is provided with a spring pressed catch or dog adapted to selectively engage the notches of an arc plate 10' to hold the hand lever 10 in various adjusted positions. It is clear that operation of the lever 10 will cause movement of the beam 3 and consequent shifting of the shafts. A hand lever and bell crank lever may also be placed near the rear seat, if desired, to assist in the operation.

It is thought that the operation and use of the invention will be clear from the preceding detailed description.

Having thus fully described my invention, what I claim as new and desire to secure by Letters Patent, is:—

A shaft shifter consisting of the combination of a rod mounted in the forward end of a vehicle, a shaft connecting beam, and eyes connected to said beam and working laterally on said rod, with a plate secured rigidly to said beam, a plate hinged to the first plate, a bell crank lever, slidable pivotal connections between the latter plate and said lever, and a quadrant and sector for shifting said beam to any point desired.

In witness whereof I have hereunto set my hand in the presence of two witnesses.

JOHN T. EMMERSON.

Witnesses:
    FRANK R. TIGHE,
    D. O. BOUJOIN.